G. A. ANDERSON.
CAR TRUCK.
APPLICATION FILED JAN. 20, 1921.
1,414,919.
Patented May 2, 1922.
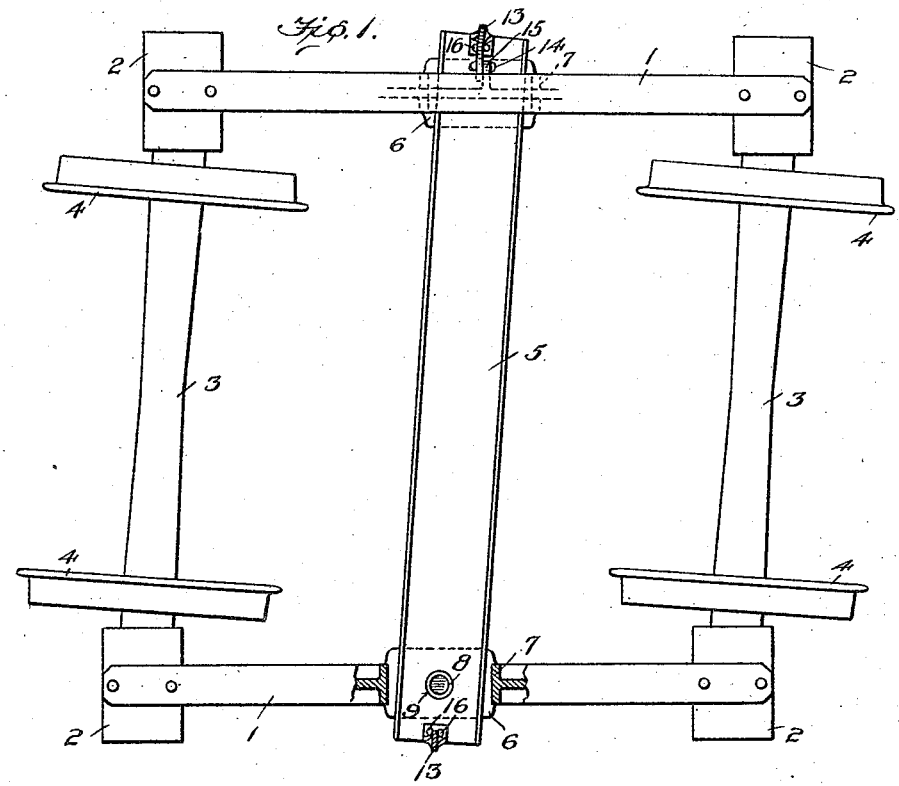
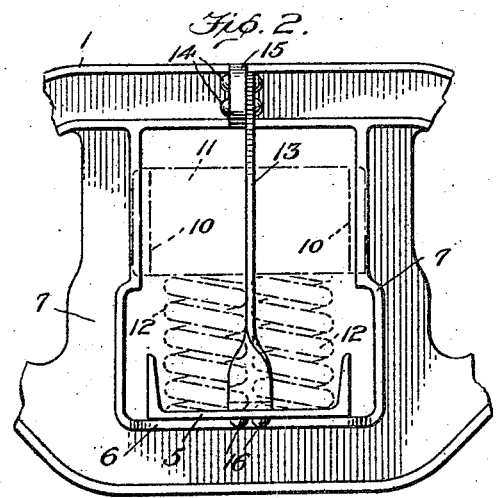
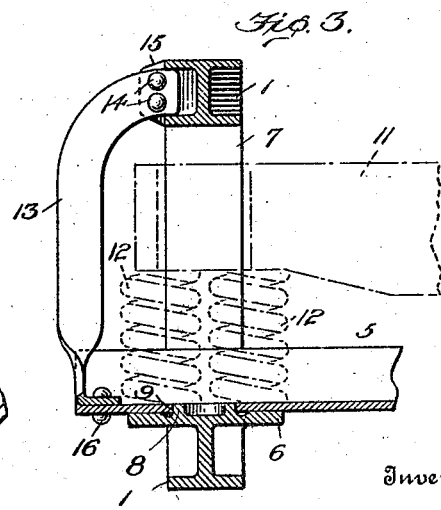
Witness
Edwin L. Bradford
Inventor
Gustaf Arvid Anderson
By Ernest F. Mechlin
His Attorney

UNITED STATES PATENT OFFICE.

GUSTAF ARVID ANDERSON, OF BALTIMORE, MARYLAND, ASSIGNOR TO THE T. H. SYMINGTON COMPANY, OF NEW YORK, N. Y., A CORPORATION OF DELAWARE.

CAR TRUCK.

1,414,919. Specification of Letters Patent. Patented May 2, 1922.

Application filed January 20, 1921. Serial No. 438,652.

*To all whom it may concern:*

Be it known that I, GUSTAF ARVID ANDERSON, a citizen of the United States, residing at Baltimore, in the State of Maryland, have invented certain new and useful Improvements in Car Trucks; and I do hereby declare the following to be a full, clear, and exact description of the invention, such as will enable others skilled in the art to which it appertains to make and use the same.

My invention relates to flexible trucks for railway cars and particularly to an improved type of flexible truck in which relative displacement of the side frame members longitudinally of the truck from normal position is yieldingly resisted by resilient means which are adapted to restore the parts to normal relation upon cessation of the force by which their departure from such relation has been induced.

The principal object of the invention is to provide a truck of the character indicated in which the resilient means for controlling the relative longitudinal displacement of the truck side frame members is so combined and arranged with the associated truck parts as to enable it to be of a simple, durable and rugged nature. A further object of the invention is to provide a resilient means for the purpose indicated which is well adapted to be located in a position enabling it to be readily inspected without requiring the trainman to go between the truck wheels.

The primary feature of my invention by which these objects are accomplished consists in employing torsion spring means interposed between the respective side frame members and a member or members adapted to change their angular relations to the respective side frames when the latter are displaced longitudinally of the truck from normal position.

A further principal feature of the invention resides in yieldingly controlling the relative longitudinal movements of the truck side frames by means of a torsion bar which is rigidly connected to one of the side frame members and to the means by which the latter are connected across the truck.

There are still further features of the invention, residing in particular combinations and features of elemental construction, all as will hereinafter appear.

In the drawings illustrating the preferred embodiment of the invention, the scope whereof is pointed out in the claims, Figure 1 is a view of a car truck, partly in plan and partly in horizontal section, embodying the invention, the truck bolster, which may be of the form ordinarily employed in flexible trucks, being omitted, and the parts being shown in the angular relations they assume when passing around a sharp curve.

Figure 2 is a detail side elevation of the central portion of the car truck illustrated in Fig. 1, the truck bolster and bolster springs being diagrammatically illustrated in dotted lines.

Figure 3 is a vertical central section of the portion of the truck illustrated in Fig. 2, the torsion bar being in elevation and the bolster and bolster springs being shown in dotted lines.

In the drawings, 1, 1 are truck side frame members which are adapted to move with respect to each other longitudinally of the truck. Each side frame is provided at its opposite ends with journal boxes 2 receiving the journal ends of axles 3 upon which the truck wheels 4 are mounted.

The side frame members 1 are movably connected across the truck by connecting means 5 preferably constituting a spring plank element. If the connecting means is in the form of a spring plank, as is preferred, its opposite ends may conveniently project through the respective bolster openings 6 of the side frames between the columns 7 of the latter, sufficient clearance being provided between the spring plank and the columns 7 to allow the former to turn freely when the side frames are displaced longitudinally from normal position as the result of external forces applied to the truck incident to its passage around a curve or because of passing over defective switch points or imperfect rail joints. The spring plank 5 may be advantageously connected to the side frames 1 by means of pivot bosses 8 which are integral with the respective side frames and project into pivot apertures 9 in the corresponding ends of the spring plank. As is customary in flexible trucks, sufficient clearance is provided, as indicated at 10, between the sides of the bolster 11 and the truck columns 7 to allow the bolster to change its horizontal angular relation with respect to the side frames without binding upon the columns. The bolster may be yieldingly supported by springs such as 12 which are seated upon the spring plank 5.

The torsion spring means employed for yieldingly resisting relative longitudinal displacement of the side frame members 1 from normal position may consist of a plurality of tempered steel bars 13 which are interposed between the cross connecting member 5 and the respective side frames. Each torsion bar is preferably located outwardly of the side frame member to which it is secured, its upper end being rigidly attached, as by means of rivets 14, to the side frame member above the bolster 11. To provide for attaching the torsion bar to the side frame without weakening the latter, each side frame may be provided with an outwardly extending lug 15 perforated to receive the rivets 14. The lower end of each torsion bar is rigidly attached to the neighboring outwardly projecting end of the spring plank 5, such connection being conveniently made by rivets 16 which pass directly through the spring plank.

While it is preferred to employ a plurality of torsion spring means to resist relative longitudinal displacement of the side frame members 1 from normal position, and to associate said spring means with the corresponding side frames at each end of the spring plank, it will be obvious that if desired a single torsion bar 13 may be used to control relative longitudinal movement of the side frames.

The construction being substantially such as hereinbefore pointed out, a relative displacement of the side frames 1 from normal position will entail a departure of the spring plank 5 from the position which it occupies when the truck is in square. This change in the angular relation of the spring plank and side frames causes the torsion bars 13 to be twisted or flexed, thus yieldingly resisting the displacement of the side frames from normal. When the external force inducing the displacement of the truck parts from normal relation ceases to act, the energized torsion bars 13 will operate to restore the truck parts to normal relation.

I claim:—

1. In a car truck, the combination with side frame members which are relatively movable longitudinally of the truck, of means for movably connecting said side frame members, and torsion spring means for resisting relative longitudinal displacement of said side frame members from normal position.

2. In a car truck, the combination with side frame members which are relatively movable longitudinally of the truck, of means for movably connecting said side frame members, and torsion spring means operatively interposed between at least one of said side frame members and said connecting means for yieldingly resisting relative longitudinal displacement of said side frame members from normal position.

3. In a car truck, the combination with side frame members which are relatively movable longitudinally of the truck, of a torsion bar adapted yieldingly to resist longitudinal displacement of said side frame members from normal position.

4. In a car truck, the combination with side frame members which are relatively movable longitudinally of the truck, of a spring plank movably connecting said side frame members, and torsion spring means operatively interposed between said spring plank and at least one of said side frame members for yieldingly resisting relative longitudinal displacement of said side frame members.

5. In a car truck, the combination with side frame members which are relatively movable longitudinally of the truck, of means for movably connecting said side frame members, and spring means rigidly secured to said connecting means and to one of said side frame members for yieldingly resisting relative longitudinal displacement of said side frame members from normal position.

6. In a car truck, the combination with spaced side frame members which are relatively movable longitudinally of the truck, of means for pivotally connecting said side frame members, and means rigidly connected to said connecting means and to an adjacent side frame member for yieldingly resisting a longitudinal displacement of said side frame members from normal position.

7. In a car truck, the combination with side frame members which are relatively movable longitudinally of the truck, of means for movably connecting said side frame members, and a torsion bar rigidly secured to said connecting means and to one of said side frame members for yieldingly resisting relative longitudinal displacement of said side frame members from normal position.

8. In a car truck, the combination with side frame members which are relatively movable longitudinally of the truck, of a bolster extending between said side frame members and movable with respect thereto, and spring means projecting outwardly beyond the proximate end of said bolster for yieldingly resisting longitudinal displacement of said side frame members from normal position.

9. In a car truck, the combination with side frame members which are relatively movable longitudinally of the truck, of means for movably connecting said side frame members, and spring means for yieldingly resisting relative longitudinal displacement of said side frame members from normal position, said spring means being operatively interposed between said connecting means and one of said side frames and being located outwardly of the side frame member with which it cooperates.

10. In a car truck, the combination with side frame members which are relatively movable longitudinally of the truck, of means for movably connecting said side frame members, and spring means operatively interposed between said connecting means and one of said side frame members and adapted to press upon said side frame member above said connecting means, said spring means being adapted yieldingly to resist relative longitudinal displacement of said side frame members from normal position.

11. In a car truck, the combination with side frame members which are relatively movable longitudinally of the truck, of a bolster adapted to change its angular relation horizontally with respect to said side frame members, a spring plank movably connecting said side frame members, and means acting upon at least one of said side frame members at a point above said bolster for yieldingly resisting relative longitudinal displacement of said side frame members.

12. In a car truck, the combination with side frame members which are relatively movable longitudinally of the truck, of a spring plank pivotally connected to said side frame members at its opposite ends, and torsion spring means for yieldingly resisting relative longitudinal displacement of said side frame members from normal position, said spring means being anchored at one end to said spring plank and being anchored at the other end to the adjacent side frame member.

In testimony whereof I affix my signature.

GUSTAF ARVID ANDERSON.